United States Patent [19]
Guzowski

[11] Patent Number: 6,033,617
[45] Date of Patent: Mar. 7, 2000

[54] PIPE BELLING PROCESS

[75] Inventor: Samuel Guzowski, Appartado, Costa Rica

[73] Assignee: S&B Technical Products, Inc., Fort Worth, Tex.

[21] Appl. No.: 09/064,489

[22] Filed: Apr. 22, 1998

[51] Int. Cl.[7] .............................. B29C 57/08; B29C 51/36
[52] U.S. Cl. ......................... 264/516; 264/249; 264/275; 264/277; 425/393; 425/403; 425/504; 425/508; 425/DIG. 218
[58] Field of Search ...................................... 264/516, 275, 264/292, 249, 277; 425/393, DIG. 218, 403, 504, 508

[56] References Cited

U.S. PATENT DOCUMENTS

| | | | |
|---|---|---|---|
| 4,030,872 | 6/1977 | Parmann | 425/393 |
| 5,928,451 | 5/1998 | Johansson et al. | 156/242 |

OTHER PUBLICATIONS

The Rieber Sealing System for PVC Pipes brochure.

*Primary Examiner*—Jan H. Silbaugh
*Assistant Examiner*—Dae Young Lee
*Attorney, Agent, or Firm*—Charles D. Gunter, Jr.

[57] ABSTRACT

An improved pipe belling process is shown which features a mandrel having spring loaded detents at one circumferential position on an outer working surface. A gasket is installed on the outer working surface in abutment with the exposed detents. The heated socket end of a thermoplastic pipe is forced over the mandrel exterior and over the gasket with the detents in an extended position. This action causes the heated socket end of the pipe to flow over the gasket and form a retention groove for retaining the gasket before again contacting the working surface of the mandrel. The heated end of the pipe is cooled and retracted from the working surface of the mandrel. The retraction step serves to force the spring loaded detents to the retracted position to allow travel of the thermoplastic pipe over the working surface of the mandrel with the gasket being retained within the formed groove.

12 Claims, 4 Drawing Sheets

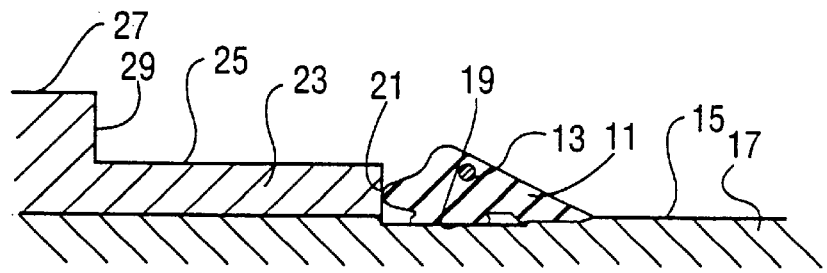
(PRIOR ART) FIG. 10
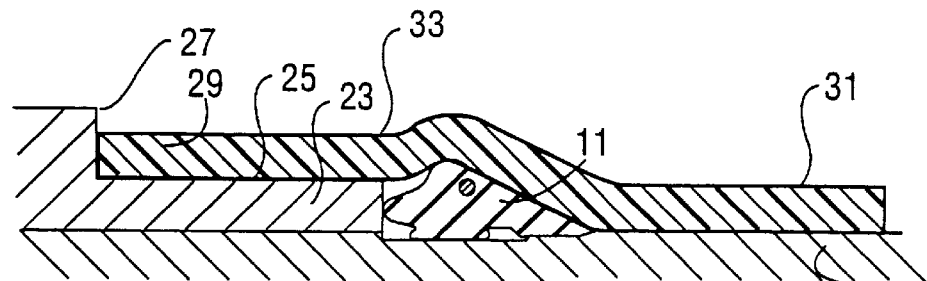
(PRIOR ART) FIG. 11
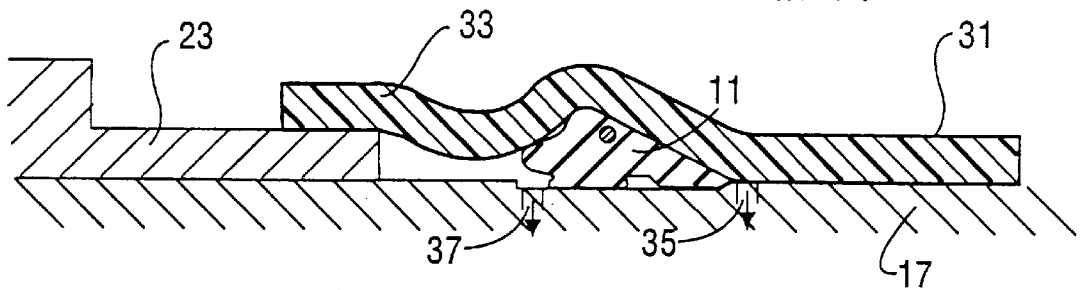
(PRIOR ART) FIG. 12
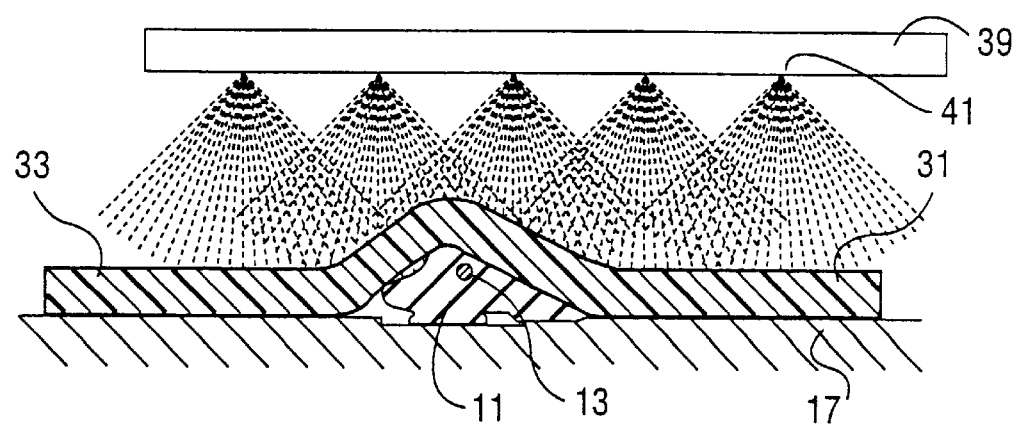
(PRIOR ART) FIG. 13

PIPE BELLING PROCESS

BACKGROUND OF THE INVENTION

1. Field of the Invention

The present invention relates generally to sealing systems for thermoplastic pipes and, specifically, to an improved belling process for installing a gasket in a socket end of a thermoplastic pipe.

2. Description of the Prior Art

Pipes formed from thermoplastic materials including polyethylene and PVC are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

A variety of other shortcomings have existed in such pipe joints of the prior art. For example, unintentional earth loading, such as traffic load, can be transferred to the socket end of the pipe sections, leading to deformations and associated leakage in the joints. Certain heat strains in the pipes, such as can occur on storage in hot weather or by close proximity to heat sources can result in deformations, shrinkage of the pipe material and resulting leakage.

One early attempt to ensure the integrity of such pipe joints was to provide local reinforcement of the groove portion of the socket end by means of a heavier wall thickness in this region of the pipe. In some cases, reinforcing sleeves were also utilized. Each of these solutions was less than ideal, in some cases failing to provide the needed joint integrity and often contributing to the complexity and expense of the manufacturing or field assembly operations.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint. These features increased the reliability of the joint and decreased the risk of leaks or possible failure due to abrasion or other factors. The Rieber process is described in the following issued U.S. Pat. Nos.: 4,120,521; 4,061,459; 4,030,872; 3,965,715; 3,929,958; 3,887,992; 3,884,612; and 3,776,682.

Despite the advances offered by the improved Rieber process, a need continued to exist for improving the simplicity and efficiency of the belling operation.

Accordingly, an object of the present invention is to provide a method of installing a gasket in a socket end of a thermoplastic pipe in a Rieber-type process in which fewer mould parts are required and in which fewer operational steps are employed.

SUMMARY OF THE INVENTION

A method is shown for installing a gasket in a socket end of a thermoplastic pipe which is used to form a pipe joint or coupling. A mandrel is provided with an inner end and an outer end and having a generally cylindrical outer working surface. A gasket is installed at a first circumferential position on the outer working surface of the mandrel. A plurality of outwardly biased detents are provided at a second circumferential location on the mandrel nearer the inner end of the mandrel. The outwardly biased detents have exposed lip portions which abut the gasket in a normally extended position. The detents are also retractable to a retracted position flush with the outer working surface of the mandrel.

The socket end of the thermoplastic pipe is heated and then forced over the working surface of the mandrel and over the gasket with the detents in the extended position, whereby the heated socket end of the thermoplastic pipe flows over the gasket to form a retention groove for retaining the gasket and again contacts the working surface of the mandrel. The heated socket end of the thermoplastic pipe is then cooled and retracted from the working surface of the mandrel. The retracting step serves to force the detents to the retracted position to allow travel of the thermoplastic pipe over the working surface of the mandrel.

The method of the invention also allows two or more gaskets to be simultaneously installed within the socket end of a thermoplastic pipe during the belling process.

Additional objects, features and advantages will be apparent in the written description which follows.

BRIEF DESCRIPTION OF THE DRAWINGS

FIGS. 10–13 are simplified, schematic views of the prior art Rieber process for installing a gasket in a socket end of a thermoplastic pipe.

DETAILED DESCRIPTION OF THE INVENTION

Figure 1:
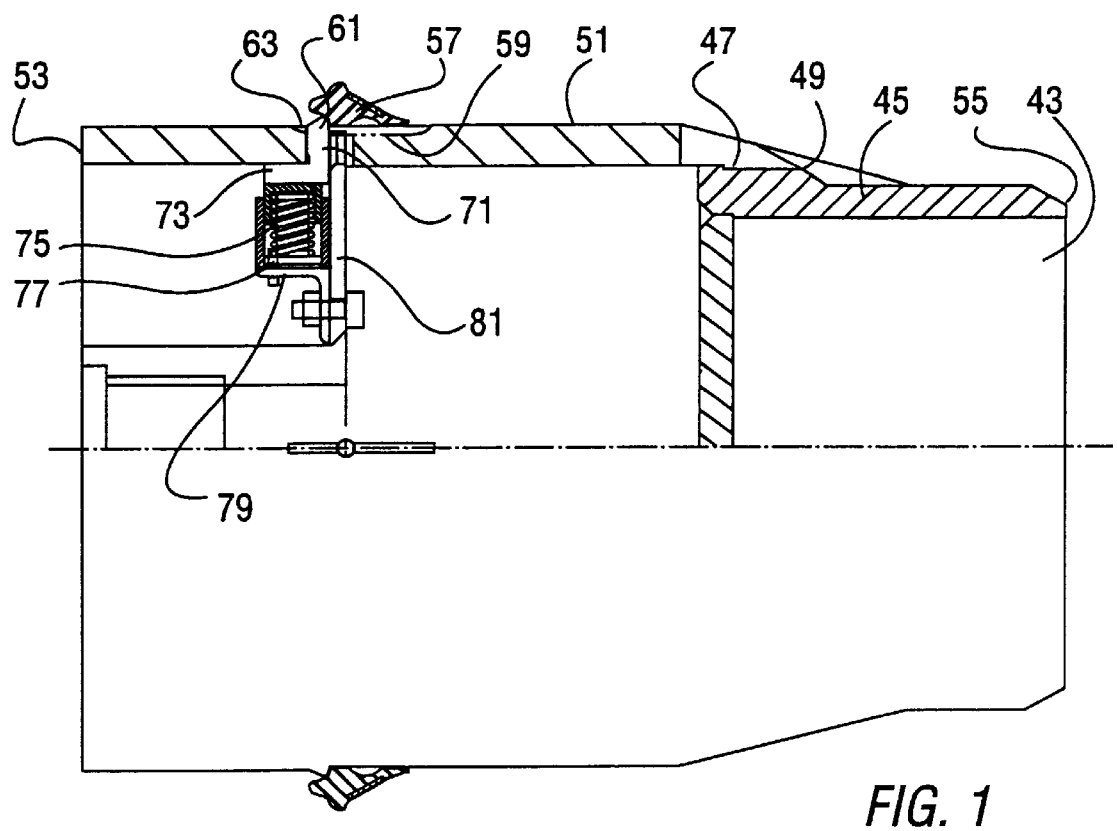
FIG. 1 is a side, partial cross-sectional view of the improved mandrel used in the belling process of the invention.

The advantages of the method of the invention can best be understood with reference to a simplified discussion of the prior art Rieber process. Turning first to FIGS. 10–13, the prior art process is illustrated. FIG. 10 shows a section of a conventional elastomeric sealing gasket 11 having a steel reinforcing ring 13 in place on the generally cylindrical outer working surface 15 of the mandrel 17 used in the belling process. The elastomeric gasket 11 can be formed of, for example, rubber and is ring shaped, circumferential member having an inner compression surface 19 and an exposed nose portion 21 which, as shown in FIG. 10, abuts a forming collar 23. The forming collar 23 has a first generally cylindrical extent 25 which is joined to a second cylindrical extent 27 by a step region 29, whereby the second extent 27 is of greater external diameter than the first cylindrical extent 25, shown in FIG. 10.

In the first step of the prior art process, the steel reinforced elastomeric ring 11 is thus placed onto the working surface of the mandrel 17 and pushed to a position against the back-up or forming collar 23. In this position, the gasket is firmly anchored to the mandrel surface with the rubber between the mandrel and the steel-ring of the gasket being compressed by approximately 20%.

In the second step of the prior art process, the socket end 33 of the thermoplastic pipe 31 is heated and pushed over the steel mandrel 17, gasket 11 and back-up collar 23. The socket end 33 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint.

The socket end 33 flows over the first cylindrical extent 25 of the back-up collar 23 and abuts the step region 29 in the second step of the process. It was critical in the prior art technique that the first cylindrical extent 25 of the back-up collar 23 be maintained at the correct temperature, otherwise flaws were produced in the interior mouth region of the socket end of the pipe.

In the next step of the prior art process (FIG. 12) the mandrel and pipe move away from the back-up collar 23 and the pipe socket end 33 retracts around the mandrel 17 and gasket 11 due to the elastic forces of the thermoplastic material. Typically, vacuum was also applied through ports 35, 37 which connected the mandrel working surface with a vacuum source (not shown).

In the final step of the prior art process, the pipe socket end 33 is cooled by means of a water spray bar 39 and spray nozzles 41. As the cooling takes place, the pipe socket end 33 shrinks around the gasket 11, thus compressing the rubber body of the gasket between the steel reinforcing ring 13 and the socket-groove to establish a firm seal. Because the sealing of the gasket against the socket took place under controlled conditions in the factory, there was no possibility that sand or similar contaminates would penetrate the crucial sealing zone of the gasket during storage, transportation or installation.

The above described Rieber process has been in commercial use since the early 1970's and is described in the above referenced issued United States patents, among other sources. It will thus be well familiar to those skilled in the thermoplastic pipe sealing arts.

Turning to FIG. 1, there is shown the improved mandrel of the invention, designated generally as 43. The mandrel is a generally cylindrical member including an outer cylindrical extent 45 which, in this case, is joined to an inner cylindrical extent 47 of slightly greater external diameter forming a gently sloped external region 49. The inner and outer extent 47, 45 can be of steel and together form the generally cylindrical outer working surface 51 between the inner end 53 and outer end 55 thereof. As will be explained more fully, a gasket 57 is installed at a first circumferential position 59 which forms a slight recess on the outer working surface 51 of the mandrel 43.

Figure 2:
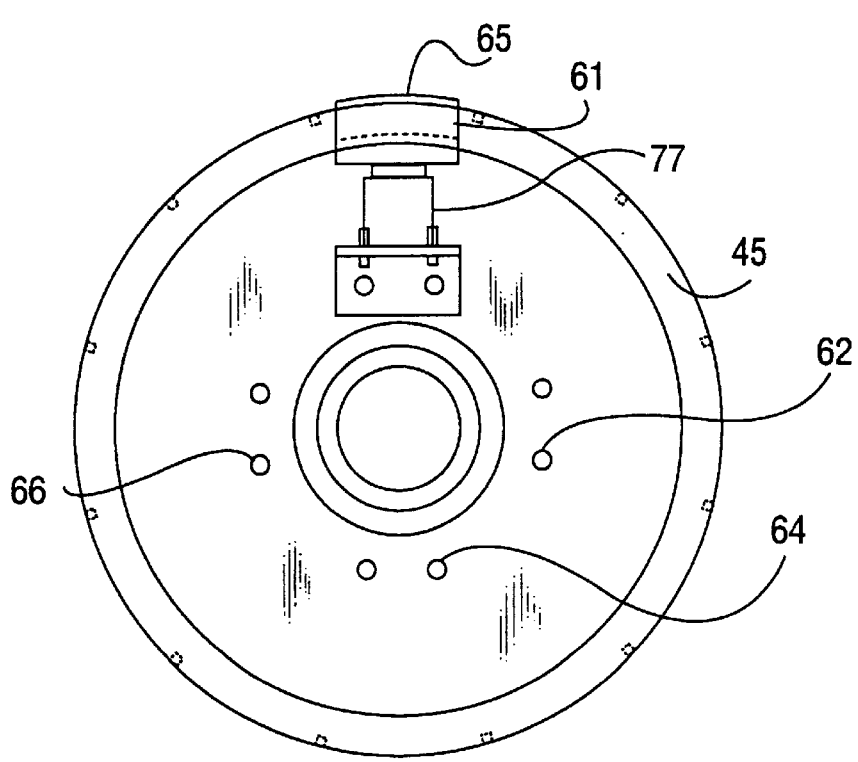
FIG. 2 is a simplified, end view of the mandrel of FIG. 1 showing the spring loaded detents thereof.

A plurality of spring loaded detents 61 are located at a second circumferential location 63 which is nearer the inner end 53 of the mandrel 51. As shown in FIG. 2, the spring loaded detents 61 have exposed lip portions 65 which, as shown in FIGS. 3–6 abut the gasket 57 in a normally extended position. As described with respect to the prior art process, the gasket 57 (FIG. 3) has a circumferential compression surface 67 and a circumferential nose region 69 which protrudes generally in the direction of the inner end 53 of the mandrel in the relaxed state.

As shown in FIG. 1, the spring loaded detents 61 are "L-shaped" members having a vertical extent 71 joined to a horizontal extent 73. A biasing member, such as coil spring 75, is located within a spring chamber 77 and acts upon the horizontal extent 73 of the detent, normally biasing the detent to the exposed position shown in FIG. 1.

The spring chambers 77 can be mounted in any convenient fashion within the interior of the mandrel 51, such as by bolting a mounting plate 79 to a spacer plate 81 which is located at one circumferential location within the interior of the mandrel 51.

Generally two or more detents and associated spring chambers will be located about the circumference of the first circumferential location on the mandrel. In the preferred embodiment of the invention, four spring loaded detents are located at equally spaced positions about the periphery of the mandrel at the first circumferential location. The additional positions are indicated at 62, 64 and 66 in FIG. 2. The spring loaded detents are also retractable to a retracted position (FIG. 7) with the lip portions 65 flush with the outer working surface 51 of the mandrel 43.

FIGS. 3–8 illustrate, in simplified schematic fashion, the improved method of the invention. In the first step of the present method, a gasket 57 is installed on the outer working surface 51 of the improved mandrel 43, according to the prior art placement techniques. The gasket 57 is installed at a first circumferential location on the outer working surface 51 of the mandrel 43 so that the concave region which joins the nose region 69 to the compression surface 67 abuts the lip portion 65 of the spring loaded detent 61. The spring loaded detents 61 have an arcuate external profile 83, best seen in FIG. 8 with a leading edge 85 and a trailing edge 87, the trailing edge 87 being connected to the leading edge 85 by an inclined surface which slopes in an upward radial direction from the inner end 53 of the mandrel toward the outer end 55 thereof.

Figure 3:
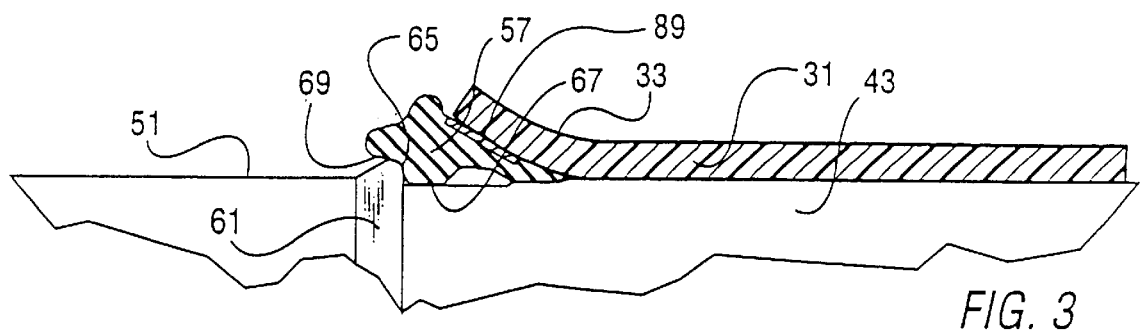
FIGS. 3–8 are simplified, schematic views of the method steps used in the method of installing a gasket of the invention.

After the gasket 57 is installed on the working surface 51 of the mandrel 43 in the position shown in FIG. 3, the socket end 33 of the thermoplastic pipe 31 is heated in conventional manner and forced over the exterior surface of the gasket 57. In this case, the gasket 57 has an external steel band 89 which serves to pre-compress the gasket against the mandrel exterior and assist in retaining the gasket in the desired position. Additionally, the gasket 57 is retained in position by the exposed lip portions 65 of the spring loaded detent 61. Other gasket designs will be familiar to those skilled in the art and include reinforcing rings and bands of various shapes either exposed on the gasket exterior or embedded within the gasket material.

Figure 4:
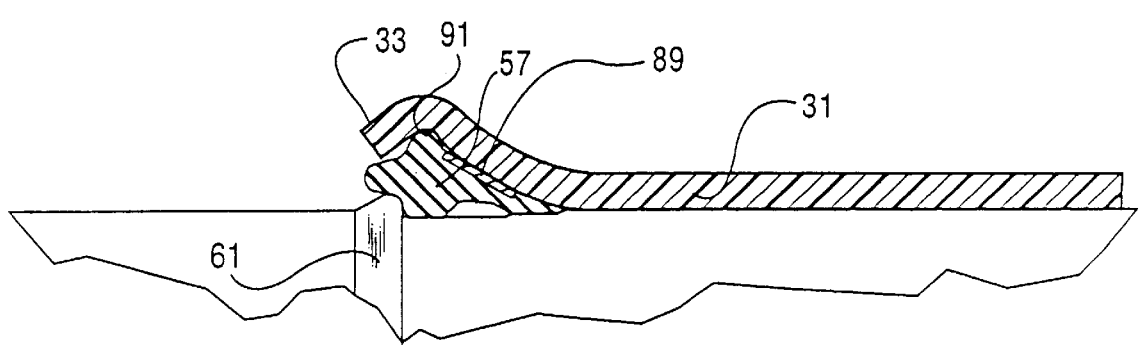
Figure 5:
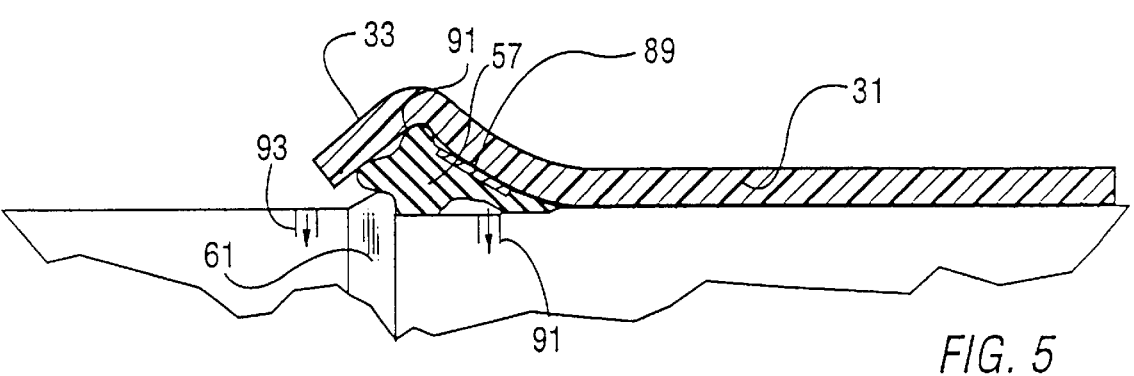
Figure 6:
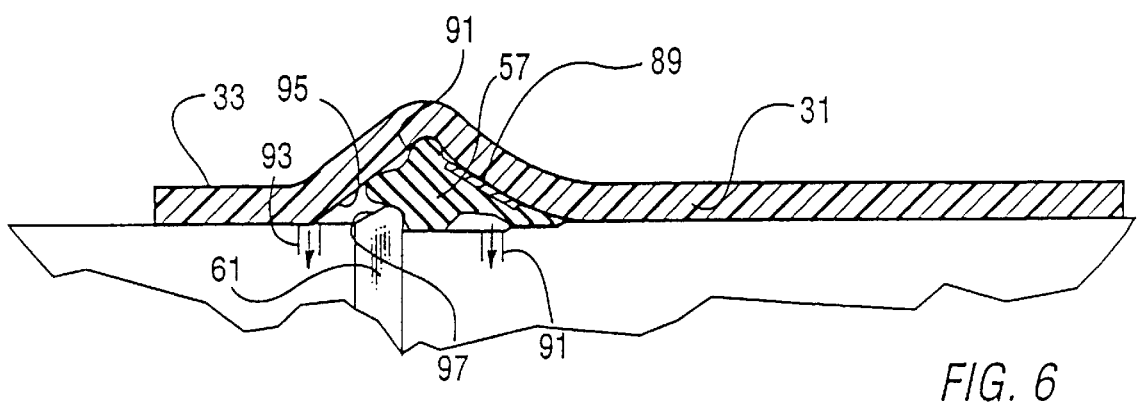

In the next step of the method, shown in FIG. 4, the heated pipe end 33 begins to flow over the rear exterior surface 91 of the gasket 57. As the pipe socket end 33 continues to flow over the gasket, it is gradually retracted about the mandrel exterior (FIGS. 5–6). As the heated pipe end flows over the gasket 57, the action of retracting the gasket can be facilitated by applying a vacuum through the mandrel ports 91, 93. With the gasket in the position shown in FIG. 6, the heated socket end would typically be cooled, as by spraying with a water bath as described with respect to FIG. 13 of the prior art.

Figure 7:
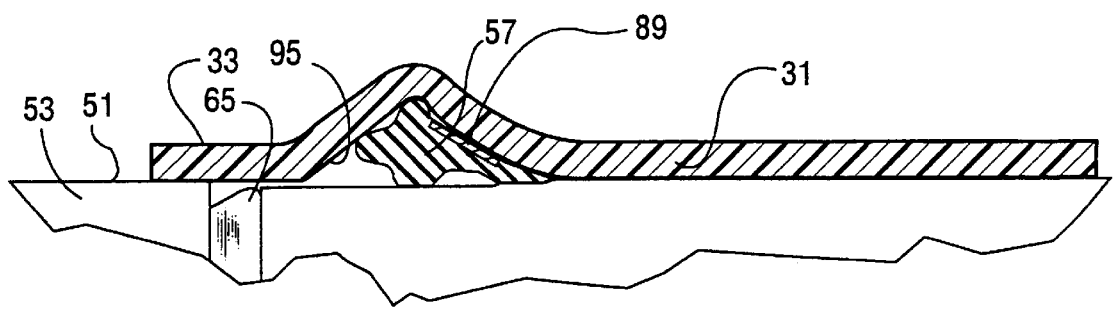
Figure 8:
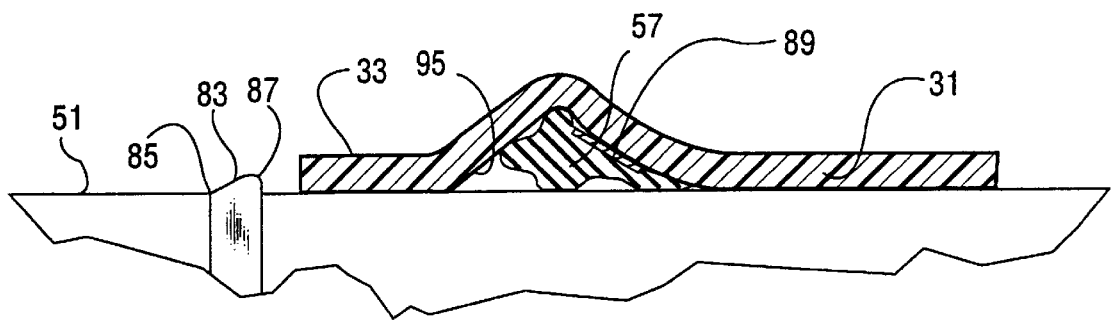

FIGS. 7 and 8 show the final steps in the improved process in which the pipe 31 and gasket 57 are withdrawn from the mandrel working surface 51. As the socket end 33 is retracted, the internal groove surface 95 (FIG. 6) contacts the sloped region 97 of the exposed detent lip, thereby forcing the spring loaded detent to the retracted position shown in FIG. 7. As the pipe end is removed from the mandrel 43, the spring loaded detents return to the exposed position shown in FIG. 8.

Figure 9:
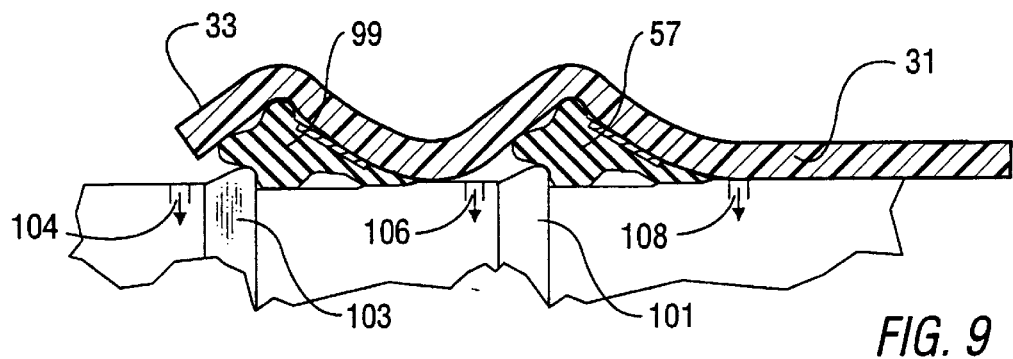
FIG. 9 is a side, partial cross-sectional view of the mandrel of FIG. 1 modified to accept an additional gasket and showing the heated pipe end being forced over both gaskets.

Because there is no back-up collar utilized in the improved method, more than one gasket can be installed at more than one circumferential location on the mandrel exterior. For example, FIG. 9 illustrates a pair of sealing gaskets 57, 99 with the socket end 33 of the heated pipe being forced over both gaskets, the gaskets being retained in position by means of the spring loaded detents 101, 103. Vacuum is applied through parts 104, 106, 108 to facilitate contraction of the gasket material to the position shown in FIG. 9. The pipe 31 and gaskets 57, 99 are then withdrawn from the mandrel working surface 51 in the same manner as previously described with respect to FIGS. 7 and 8.

While the invention has been described with respect to a preferred embodiment, those skilled in the art will appreciate that various changes and modifications are possible without departing from the spirit of the invention. For example, while the detents are shown as being spring loaded, they could be operated by pneumatic, hydraulic, magnetic or suitable lever actuation either contained or exposed. In the case of an extremely thin wall pipe, it might be possible to eliminate the spring loaded detents and use the plastic elasticity characteristics of the pipe instead.

An invention has been provided with several advantages. The improved mandrel of the invention simplifies the Rieber process, requiring fewer parts and fewer method steps. The simplified manufacturing process saves time and is more reliable since the temperature of the exposed surface of a back-up collar is not critical to the process. The precise location of the gasket is set constant by the detents, instead of relying upon a moving mechanism like the back-up collar of the prior art. The flow of the heated pipe end is actually facilitated by the absence of the back-up collar. As shown in FIGS. 4 and 5, the heated plastic attempts to return naturally to the mandrel diameter, causing a better formed bell over the gasket and assuring the fit of the gasket inside the bell. It is not necessary to provide an intricate control mechanism for the back-up collar including limit switches temperature measurement devices and other components. Also, alignment of the heated pipe end with the exposed surface of the collar is not critical. The method of the invention also allows multiple gaskets to be installed within multiple grooves formed within the pipe socket end.

While the invention has been shown in only one of its forms, it is not thus limited but is susceptible to various changes and modifications without departing from the spirit thereof.

What is claimed is:

1. A method of installing a gasket in a socket end of a thermoplastic pipe which is used to form a pipe coupling, the method comprising the steps of:

providing a mandrel with an inner end and an outer end and having a generally cylindrical outer working surface;

installing a gasket at a first circumferential position on the outer working surface;

providing a plurality of outwardly biased detents at a second circumferential location on the mandrel nearer the inner end of the mandrel, the outwardly biased detents having exposed lip portions which abut the gasket in a normally extended position, the detents being retractable to a retracted position flush with the outer working surface of the mandrel;

heating a socket end of the thermoplastic pipe;

forcing the heated socket end of the thermoplastic pipe over the working surface of the mandrel and over the gasket with the detents in the extended position, the gasket being retained in position by abutting the exposed lip portions of the detents, whereby the heated socket end of the thermoplastic pipe flows over the gasket to form a retention groove for retaining the gasket and again contacts the working surface of the mandrel;

cooling the heated socket end of the thermoplastic pipe;

retracting the cooled socket end of the thermoplastic pipe and the retained gasket from the working surface of the mandrel, the retracting step serving to force the detents to the retracted position to allow travel of the thermoplastic pipe over the working surface of the mandrel; and wherein the heated, socket end of the thermoplastic pipe directly contacts the working surface of the mandrel after passing over the gasket, without contacting any additional apparatus used in the method.

2. The method of claim 1, wherein the gasket is an elastomeric, ring shaped member having a circumferential contact area and an exterior surface, and wherein the detents contact the exterior surface of the gasket in the extended position.

3. The method of claim 2, wherein the detents are located at spaced intervals at one circumferential location on the working surface of the mandrel.

4. The method of claim 1, wherein the socket end of the thermoplastic pipe is isolated from the detents as the socket end of the thermoplastic pipe is forced over the working surface of the mandrel.

5. The method of claim 1, further comprising the step of:

applying a vacuum to the heated, socket end of the thermoplastic pipe after the pipe has been forced over the working surface of the gasket and mandrel to thereby force the heated, socket end to contract about the mandrel and gasket.

6. A method of installing a gasket in a socket end of a thermoplastic pipe having an exterior and a generally cylindrical interior, the socket end being used to form a pipe coupling, the method comprising the steps of:

providing a mandrel with an inner end and an outer end and having a generally cylindrical outer working surface;

installing a gasket at a first circumferential position on the outer working surface of the mandrel;

providing a plurality of spring loaded detents at a second circumferential location on the mandrel nearer the inner end of the mandrel, the spring loaded detents having exposed lip portions which abut the gasket in a normally extended position, the detents being retractable to a retracted position flush with the outer working surface of the mandrel;

heating a socket end of the thermoplastic pipe;

forcing the heated socket end of the thermoplastic pipe in a first direction over the working surface of the mandrel and over the gasket with the spring loaded detents in the extended position, the gasket being retained in position by abutting the exposed lip portions of the detents, whereby the heated socket end of the thermoplastic pipe flows over the gasket to form a retention groove for retaining the gasket and again contacts the working surface of the mandrel;

cooling the heated socket end of the thermoplastic pipe;

retracting the cooled socket end of the thermoplastic pipe and the retained gasket from the working surface of the mandrel by moving the cooled socket end in a second direction opposite to the first direction, the retracting step serving to force the spring loaded detents to the retracted position to allow travel of the thermoplastic pipe over the working surface of the mandrel; and wherein the heated, socket end of the thermoplastic pipe directly contacts the working surface of the mandrel after passing over the gasket, without contacting any additional apparatus used in the method.

7. The method of claim 6, wherein the gasket is an elastomeric, ring shaped member having a circumferential contact area and an exterior surface, and wherein the spring loaded detents contact the exterior surface of the gasket in the extended position.

8. The method of claim 7, wherein the spring loaded detents are located at spaced intervals at one circumferential location on the working surface of the mandrel.

9. The method of claim 6, wherein the socket end of the thermoplastic pipe is isolated from the spring loaded detents as the socket end of the thermoplastic pipe is forced over the working surface of the mandrel.

10. The method of claim 6, further comprising the step of:

applying a vacuum to the heated, socket end of the thermoplastic pipe after the pipe has been forced over the working surface of the gasket and mandrel to thereby force the heated, socket end to contract about the mandrel and gasket.

11. The method of claim 6, wherein the spring loaded detents have an arcuate external profile with a leading edge and a trailing edge, and wherein the trailing edge is connected to the leading edge by an inclined surface which slopes in an outward radial direction from the inner end of the mandrel toward the outer end thereof.

12. A method of installing a plurality of gaskets in a socket end of a thermoplastic pipe which is used to form a pipe coupling, the method comprising the steps of:

providing a mandrel with an inner end and an outer end and having a generally cylindrical outer working surface;

installing a first gasket at a first circumferential position on the outer working surface;

providing a plurality of spring loaded detents which abut the gasket in a normally extended position, the detents being retractable to a retracted position flush with the outer working surface of the mandrel;

installing at least a second gasket at an additional circumferential position on the outer working surface;

providing a plurality of spring loaded detents with exposed lip portions which abut the second gasket in a normally extended position, the detents being retractable to a retracted position flush with the outer working surface of the mandrel;

heating a socket end of the thermoplastic pipe;

forcing the heated socket end of the thermoplastic pipe over the working surface of the mandrel and over both the first and the second gasket with the spring loaded detents in the extended position, the gaskets being retained in position by abutting the exposed lip portions of the respective detents, whereby the heated socket end of the thermoplastic pipe flows over both gaskets to form a spaced pair of retention grooves for retaining the gaskets and again contacts the working surface of the mandrel;

cooling the heated socket end of the thermoplastic pipe;

retracting the cooled socket end of the thermoplastic pipe and the retained gaskets from the working surface of the mandrel, the retracting step serving to force the spring loaded detents to the retracted position to allow travel of the thermoplastic pipe over the working surface of the mandrel.

\* \* \* \* \*